United States Patent
Yamada (10) Patent No.: US 9,417,327 B2
(45) Date of Patent: Aug. 16, 2016

(54) SELECTION METHOD OF SATELLITES FOR RTK POSITIONING CALCULATION AND A SELECTION DEVICE OF SATELLITES FOR THE SAME

(75) Inventor: Hideki Yamada, Chofu (JP)

(73) Assignee: ELECTRONIC NAVIGATION RESEARCH INSTITUTE, AN INDEPENDENT ADMINISTRATIVE INSTITUTION, Tokyo (JP)

( * ) Notice: Subject to any disclaimer, the term of this patent is extended or adjusted under 35 U.S.C. 154(b) by 722 days.

(21) Appl. No.: 13/442,486

(22) Filed: Apr. 9, 2012

(65) Prior Publication Data

US 2013/0088389 A1     Apr. 11, 2013

(30) Foreign Application Priority Data

Oct. 6, 2011 (JP) .................... 2011-222054

(51) Int. Cl.
 G01S 19/22    (2010.01)
 G01S 19/28    (2010.01)
 G01S 19/43    (2010.01)

(52) U.S. Cl.
 CPC .......... *G01S 19/22* (2013.01); *G01S 19/28* (2013.01); *G01S 19/43* (2013.01)

(58) Field of Classification Search
 CPC ......... G01S 19/22; G01S 19/28; G01S 19/33; G01S 19/43; G01S 19/44
 USPC ............. 342/357.67, 357.73, 357.61, 357.58, 342/357.26
 See application file for complete search history.

(56) References Cited

U.S. PATENT DOCUMENTS

| | | | | |
|---|---|---|---|---|
| 6,825,805 | B2 * | 11/2004 | Rowitch ................ | 342/357.25 |
| 7,142,155 | B2 * | 11/2006 | Iwami .................... | 342/357.25 |
| 7,148,843 | B2 * | 12/2006 | Han et al. ............... | 342/357.59 |

(Continued)

FOREIGN PATENT DOCUMENTS

| | | |
|---|---|---|
| JP | 2009-25049 | 2/2009 |
| JP | 2009-31278 | 2/2009 |

(Continued)

OTHER PUBLICATIONS

B.W. Parkinson et al., J.J. Global Positioning System: Theory and Applications, vol. 1; Progress in Astronautics and Aeronatics, vol. 163, American Institute of Aeronautics and Astronautics, Inc., p. 10-11, 1996.*

(Continued)

*Primary Examiner* — Tashiana Adams
*Assistant Examiner* — Fred H Mull
(74) *Attorney, Agent, or Firm* — Muncy, Geissler, Olds & Lowe, P.C.

(57) ABSTRACT

A selection method of satellites for RTK positioning calculation includes initializing a mask threshold of the elevation angle mask and/or the signal strength mask, setting the mask threshold as a first mask threshold other than a mask threshold which carried out an initial setting, performing a first RTK positioning calculation based on a signal from the satellite, performing a first quality check about a positioning solution in the first RTK positioning calculation, and when the first quality check is under the threshold of the ratio test, performing a second RTK positioning calculation based on the signal from the satellite newly chosen via the first mask threshold and performing a second quality check about a second positioning solution in the second RTK positioning calculation.

3 Claims, 5 Drawing Sheets

(56) References Cited

U.S. PATENT DOCUMENTS

| | | | |
|---|---|---|---|
| 7,432,853 B2* | 10/2008 | Vollath | 342/357.27 |
| 2002/0050944 A1* | 5/2002 | Sheynblat et al. | 342/357.06 |
| 2009/0322605 A1* | 12/2009 | Farmer et al. | 342/357.12 |
| 2010/0045516 A1* | 2/2010 | Nagahara | 342/357.03 |
| 2011/0037647 A1* | 2/2011 | Tajima et al. | 342/357.26 |

FOREIGN PATENT DOCUMENTS

| | | |
|---|---|---|
| JP | 2009-243940 A | 10/2009 |
| WO | WO-2006/132003 A1 | 12/2006 |

OTHER PUBLICATIONS

Parkins, "Increasing GNSS RTK availability with a new single-epoch batch partial ambiguity resolution algorithm," GPS Solut, 15, Dec. 22, 2010, pp. 391-402.

Radisic et al., "The Effect of Terrain Mask on RAIM Availability," The Journal of Navigation, 63, 2010, pp. 1-5-117.

* cited by examiner

SELECTION METHOD OF SATELLITES FOR RTK POSITIONING CALCULATION AND A SELECTION DEVICE OF SATELLITES FOR THE SAME

FIELD OF THE INVENTION

This invention relates to a selection method of satellites for RTK (Real Time Kinematic) positioning calculation and a selection method of satellites for the same.

BACKGROUND OF THE INVENTION

Generally, RTK positioning is the one method of interferometric positioning measurable in a short time. In this method, integral-value bias is determined at the time of an observation start (initialization), observational data is communicated between receivers, and this observational data performs analysis processing on real time. Thus, in RTK positioning, high precision positioning is performed moving and it is applied to the position control of movable bodies, such as a pilotless plane and a car.

Even if the number of satellites which can be caught increases in the positioning using the satellite in the urban canyon, when low elevation angle and signal strength are low, a positioning signal is judged with the mask threshold of an elevation mask or a signal strength mask (C/N0 mask) to be a big signal of a multipath error, and these satellites are not used in positioning calculation.

Figure 5:
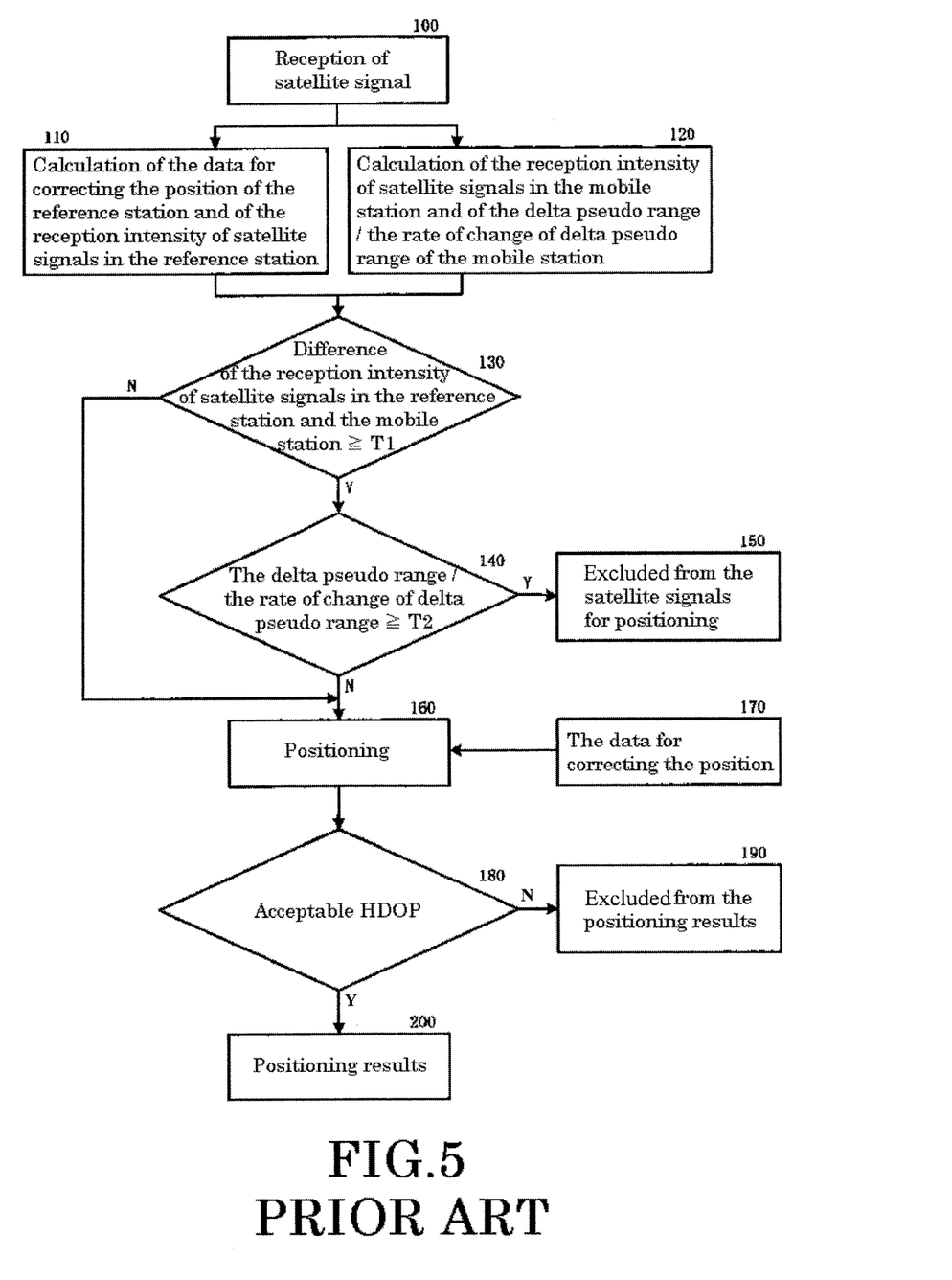
FIG. 5 is a flow chart in which the conventional GPS positioning correcting method is shown.

Generally, if a positioning signal is strongly influenced by a multipath error, signal strength will fall greatly. Then, there are the GPS receiving device and correcting method which can amend the measuring point of a mobile station by distinguishing simply and certainly the satellite signal influenced by the multipath. This correcting method is disclosed by WO 2006/132003 (patent document 1), and be shown in FIG. 5, if a satellite signal is received (step 100), the data for position correction of reference station and the reception intensity of the satellite signal in reference station will be calculated (step 110), the reception intensity of the satellite signal in a mobile station, and the delta pseudo range/delta pseudo range rate of change of a mobile station are calculated (step 120), and the reception intensity of the satellite signal in the reference station and a mobile station is compared, when the difference of the reception intensity is more than predetermined threshold T1, and when a delta pseudo range/delta pseudo range rate of change is more than predetermined threshold T2, the satellite signal of the satellite is excepted from the satellite signal for positioning, and positioning accuracy is raised. If it puts in another way, when the difference of the reception intensity of the satellite signal in a reference station and a mobile station>=T1 and the delta pseudo range/delta pseudo range rate-of-change>=T2, the satellite signal of said satellite will be excluded from the satellite signal for positioning, and positioning accuracy will be raised.

In "The Effect of Terrian Mask on RAIM Availability, T. Radisic, et al, Journal of Navigation, 2010" (non-patent document 1), the RAIM forecasting method which took the influence of the altitude by surrounding geographical feature into consideration is used. In this RAIM forecasting method, a present receiver position and present satellite information are searched for from the database of DEM (numerical Elevation Model), this data is used, an elevation mask is changed according to the altitude of geographical feature, and the Dilution Of Precision value is evaluated.

In "Increasing GNSS RTK availability with a new single-epoch batch partial ambiguity resolution algorithm, Parkins A, GPS Solutions, 2010" (non-patent document 2), in consideration of the combination of all the satellites in a visible range, the satellite with which the solution of a Ratio test becomes best in the combination of all the satellites is chosen.

DESCRIPTION OF THE INVENTION

Problem(s) to be Solved by the Invention

By the method of patent documents 1, if a positioning signal is strongly influenced by a multi-path error, signal strength will fall greatly. The difference of the theoretical signal strength depending on an elevation angle and the signal strength obtained with the mobile-station receiver of the urban canyon is compared with a predetermined threshold, the signal of the satellite beyond a threshold is eliminated and positioning accuracy is raised. Put another way, as the difference of the reception intensity of a satellite signal>=T1, and a delta pseudo range/delta pseudo range rate-of-change>=T2, the signal of a satellite is excluded from the satellite signal for positioning, and positioning accuracy will be raised. However, if the mask threshold of an elevation angle or the mask threshold of signal strength is fixed to a high value, the satellite of a low elevation angle or the satellite where signal strength is low will be eliminated, but there was a problem that all signals with a small multi-path error in the satellite where signal strength is low will also be eliminated simultaneously.

The signal in the urban canyon on the arrangement conditions of various satellites was analyzed. As a result, in cases of the signal with a low elevation angle or the signal with low signal strength, or the small multi-path error, about ten percent or more of all the signals remained usable.

In the case of the method of non-patent document 1, an elevation mask is changed according to the altitude of geographical feature, and the DOP value of the signal is evaluated.

Therefore, there was a problem that external databases, such as the DEM, were necessary.

By the method of non-patent document 2, theoretically, the check of the solution of positioning calculation and a Ratio test is repeated repeatedly until the solution of a Ratio test exceeds the threshold. Therefore, there was a problem that the computation time of the software of the portion concerning positioning calculation increased. Since there was such a problem, in the RTK positioning of which the positioning of real time is required, any method had the problem of being unsuitable.

On the other hand, although there are positioning satellites, such as GLONASS of existing Russia, European Galileo, Chinese Compass (Hokuto), and Gagan of India, development of the compound positioning art of these positioning satellites and GPS is advancing. Therefore, the algorithm which makes auto select of the small satellite of a positioning error more effectively was required.

According to the experiment of an inventor, in the present urban canyon, in the RTK positioning (RTK-GPS positioning) only using a GPS Satellite, the total time (capacity factor) which can use highly accurate positioning at an entire day was a total of 2.2-hour (9%) grade, as shown in the below-mentioned table 1. When compound RTK positioning which added not only a GPS Satellite but the signal from a GLONASS satellite was performed, as shown in the below-mentioned table 1, a capacity factor is 8.2 hours (34%), and improvement in the further capacity factor was required.

Means for Solving the Problem

A method of satellites for RTK positioning calculation via the elevation mask which chooses a satellite according to the elevation angle of a satellite, and/or, the signal strength mask which chooses a satellite with the signal strength of a satellite, includes the mask threshold of an elevation mask and/or the mask threshold of a signal strength mask are initialized, the 1st mask threshold different from the initialized mask threshold is set up to a threshold other than the initial threshold, the 1st RTK positioning calculation is performed based on the signal from the satellite chosen via the initialized mask threshold, the 1st quality check is performed about the 1st positioning solution in this 1st RTK positioning calculation, when the solution of the ratio test by this 1st quality check is more than a threshold of the ratio test which the user set up, the 1st positioning solution by the 1st RTK positioning calculation is a high precision positioning solution, when the solution of the ratio test by the 1st quality check is under the threshold of the ratio test which the user set up, change the mask threshold of either ascending vertical mask or signal strength mask into the 1st mask threshold the 2nd RTK positioning calculation is performed based on the signal from the satellite newly chosen via this 1st changed mask threshold, the 2nd quality check is performed about the 2nd positioning solution in this 2nd RTK positioning calculation, when the solution of the ratio test of the 2nd quality check is more than the threshold of the ratio test which the user set up, the 2nd positioning solution by the 2nd RTK positioning calculation is taken as a high precision positioning solution.

In the invention concerning said selection method another aspect of this invention is that the signal from GLONASS is automatically chosen with a GPS signal as a satellite signal which can be used.

In the invention concerning said selection method another aspect of this invention is that the signals from Galileo, Compass (Hokuto), GAGAN and Quasi-Zenith Satellite are automatically chosen with a GPS signal as a satellite signal which can be used.

A device of satellites for RTK positioning calculation via the elevation mask which chooses a satellite according to the elevation angle of a satellite, and/or the signal strength mask which chooses a satellite with the signal strength of a satellite, includes an initialization means that initializes the mask threshold of an elevation angle mask and/or a signal strength mask, a setting up that sets up the 1st different from the initialized mask threshold and other than the initial threshold, a RTK positioning calculation part which calculates a first and means positioning solution based on the signal (observational data) from the satellite chosen via the initialized mask threshold, the 1st quality checking means of the 1st positioning solution, a means to change a mask threshold of either said elevation angle mask or said signal strength mask into said 1st mask threshold when the solution of the Ratio test by said 1st quality check is under the threshold of the Ratio test which the user set up, change the mask threshold of either said ascending vertical mask or said signal strength mask into said 1st mask threshold, the RTK positioning calculation means that calculates the 2nd positioning solution based on the signal from satellite newly chosen via this 1st changed mask threshold, the 2nd quality checking means that checks quality of the 2nd positioning solution.

In the invention concerning said selection device, another aspect of this invention can also be automatically chosen the signal from GLONASS with the GPS signal.

In the invention concerning said selection device, another aspect of this invention is that the signals from Galileo, Compass (Hokuto), GAGAN and Quasi-Zenith Satellite are automatically chosen with a GPS signal as a satellite signal which can be used.

Effect of the Invention

Since the invention concerning a selection method and its device of satellites for the RTK positioning calculation as mentioned above, when the small signal of a multi-path error is received, even if it is a low elevation angle or a signal with low signal strength, these signals can be used effectively. The time which can use the high precision positioning in the urban canyon, i.e., a capacity factor, can be raised. In general GPS positioning, although positioning calculation and a quality check require time for processing, this invention is enough, if positioning calculation and a quality check are performed twice at the maximum.

Therefore, this invention is suitable for use of the real time in RTK positioning.

Since another aspect of this invention concerning the selection method and its selection device of satellites for the RTK positioning calculation was comprised as mentioned above, the various embodiments of the device include this aspect.

Since another aspect of this invention concerning said the selection method and its selection device of satellites for the RTK positioning calculation was comprised as mentioned above, the various embodiments of the device include this aspect.

The number of available satellites can increase, auto select of the satellite with few positioning errors can be made effectively, and a capacity factor can be raised.

Since the another aspect of this invention concerning said the selection method and its selection device of satellites for the RTK positioning calculation was comprised as mentioned above, there is the same effect of them. The signal from the positioning satellite which can be used in the future can also be used, and auto select of the satellite with few positioning errors can be made effectively. Since the number of available satellites increases, a capacity factor can be raised.

BEST MODE OF CARRYING OUT THE INVENTION

In the selection method of the satellite used for the RTK positioning calculation via the elevation angle mask which chooses a satellite according to the elevation angle of a satellite, and/or the signal strength mask which chooses a satellite with the signal strength of a satellite, the mask threshold of said elevation angle mask and/or the mask threshold of said signal strength mask are initialized, the 1st mask threshold different from the initialized mask threshold is set up to either a threshold other than the initial threshold, the 1st RTK positioning calculation is performed based on the signal from the satellite chosen via said initialized mask threshold, the 1st quality check is performed about the 1st positioning solution in this 1st RTK positioning calculation, when the solution of the Ratio test by this 1st quality check is more than the threshold of the Ratio test which the user set up, the 1st positioning solution in the said 1st RTK positioning calculation is a high precision positioning solution, when the solution of the Ratio test by said 1st quality check is under the threshold of the Ratio test which the user set up, change the mask threshold of either said ascending vertical mask or said signal strength mask into said 1st mask threshold, the 2nd RTK positioning calculation is performed based on the signal from the satellite newly chosen via said 1st mask threshold, the 2nd quality check is performed about the 2nd positioning solution in this 2nd RTK positioning calculation, when the solution of the Ratio test by this 2nd quality check is more than the threshold of the Ratio test which the user set up, the 2nd positioning solution in the said 2nd RTK positioning calculation is a high precision positioning solution. In addition, a signal of GLONASS can also be automatically chosen with a GPS signal.

Embodiment 1

First, in advance of operation, the inventor set up the GPS receiver in the known datum point of the urban canyon, and performed the fixed point observation of the entire day by RTK positioning. In the measurement environment of the urban canyon, many multipaths occur with many high-rise buildings. The urban canyon is the environment where it is most strongly influenced by a multipath error. Then, the inventor selected the urban canyon as environment considered to be the worst for performing positioning. From the result of the fixed point observation of an entire day, the inventor investigated available total time (capacity factor) for the high precision positioning by an FIX solution in the entire day. Subsequently, the inventor conducted analysis of the elevation angle of a satellite or signal strength, and the multipath error characteristic.

According to the results of an investigation of the capacity factor shown in the following table 1, in the present urban canyon, the total time (capacity factor) which can use high precision positioning by the RTK positioning (RTK-GPS positioning) only using a GPS Satellite at an entire day was 2.2 hours (9%). When compound RTK positioning which added not only a GPS Satellite but the signal from a GLONASS satellite was performed, the capacity factor was 8.2 hours (34%).

According to the result of the analysis of the multi-path error characteristic, when the signal from the satellite of a low elevation angle was low, or when the signal strength of the signal from a satellite was low, concerning the small signal of a multi-path error, it became clear that ten percent or more of the whole existed.

Figure 1:
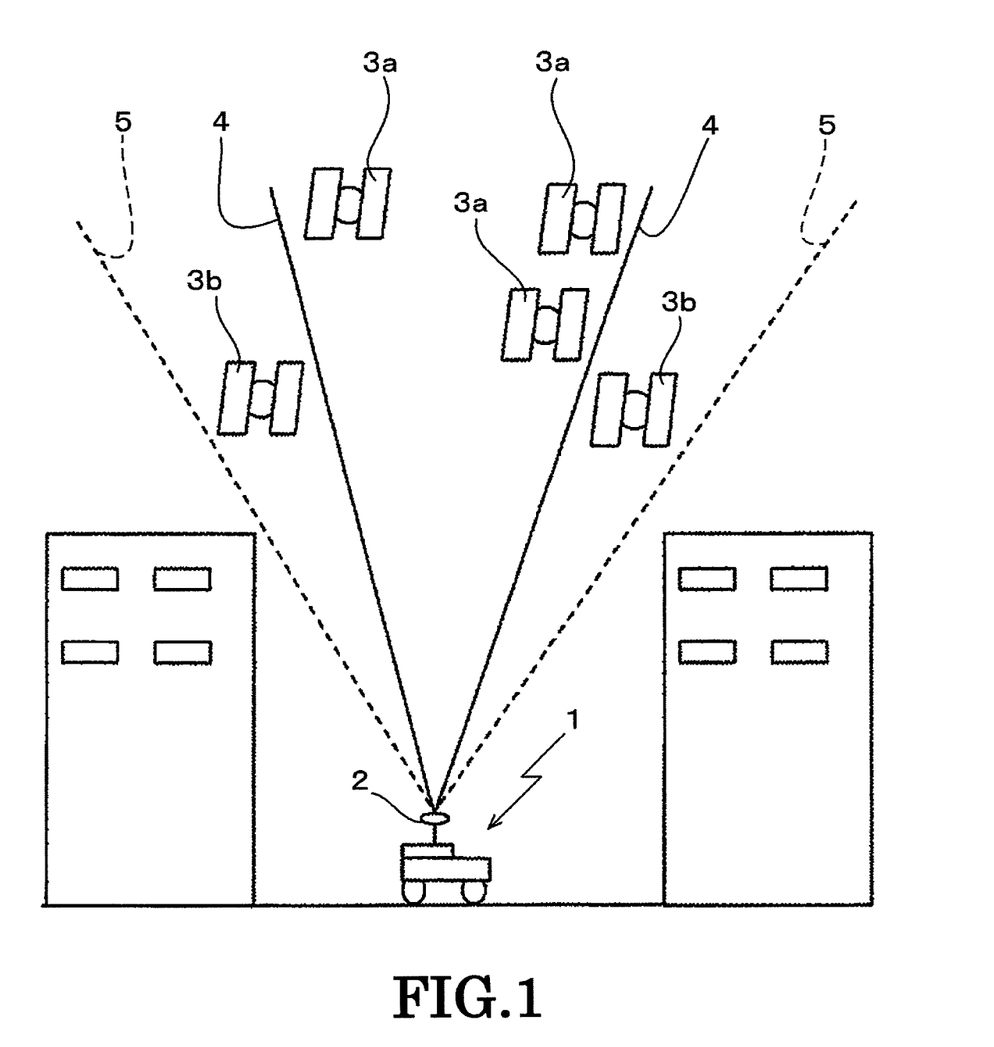
FIG. 1 shows the 1st embodiment of this invention, in the selection method and its selection device of the satellite by this invention, it is a mimetic diagram for explaining the principle when making the threshold of an elevation mask variable.
Figure 2:
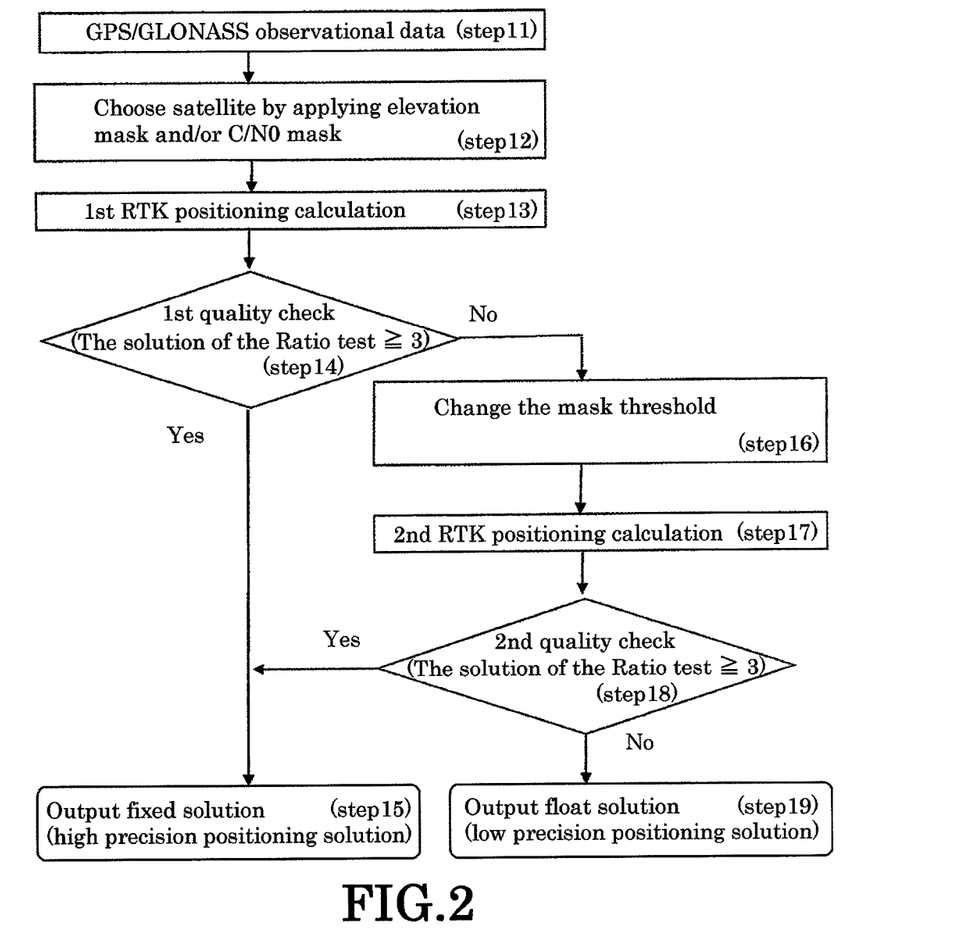
FIG. 2 shows the 1st and 2nd embodiments of this invention, it is a flow chart for explaining the selection method and its selection device of the satellite by this invention.
Figure 4:
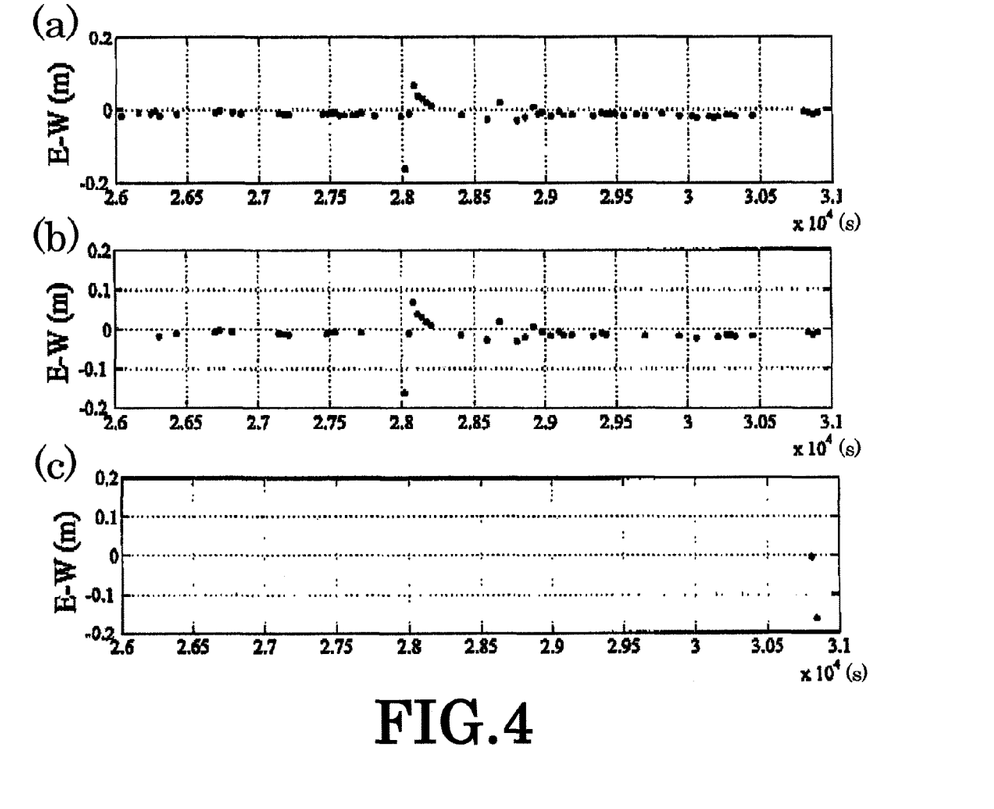
FIG. 4 shows the 1st and 2nd embodiments of this invention, it is a figure showing the RTK positioning result when RTK positioning is performed by the conventional method, and when is performing RTK positioning using the selection method and its selection device of the satellite by this invention.

Then, the 1st embodiment of this invention is explained in detail based on FIGS. 1-2, and 4.

FIG. 1 shows the 1st embodiment of this invention, and is a mimetic diagram for explaining the principle at the time of making the threshold of an elevation mask variable in the selection method of the satellite by this invention.

FIG. 2 is a flow chart for the 1st and 2nd embodiments of this invention being shown, and explaining the selection method of the satellite by this invention.

FIG. 4 shows the 1st and 2nd embodiments of this invention, and shows the RTK positioning result at the time of performing RTK positioning with the case where RTK positioning is performed by the conventional method, and the selection method of the satellite by this invention.

In FIG. 1, selection device 1 of a satellite is comprised by a user's GPS receiver 2, and is in the same urban canyon as the place which performed the fixed point observation in this embodiment 1. Satellites 3 are positioning satellites, such as GPS and GLONASS. Line 4 is a boundary line which shows the boundary of the initial value of the threshold of an elevation mask. Line 5 is a boundary line which shows the mask threshold of a different value. That is, boundary line 5 is a boundary line which shows the boundary of the threshold of the newly set-up elevation mask with the selection method of the satellite by this invention.

GPS receiver 2 has the following means. The initialization means 30 for initializing various parameters, such as a mask threshold of an elevation mask, and a mask threshold of a signal strength mask, the 1st mask threshold setting means 31 for setting up the 1st mask threshold that is different from the initialized mask threshold about the mask threshold of either an elevation mask or a signal strength mask, the 1st and 2nd RTK positioning calculation means 32 for calculating a 1st and 2nd positioning solution based on the signal from a satellite, the 1st and 2nd quality checking means 33 of a 1 st and 2nd positioning solution, the mask threshold change 34 for changing a mask threshold based on the decision result of a quality checking means 33, the quality checking means 33 of the positioning solution of this GPS receiver 2 has a calculating means of a Ratio test. The GPS receiver 2 has a satellite signals selecting means 35 to choose the signal from GLONASS automatically in addition to GPS, and a satellite signals selecting means 35 to choose the signal from Galileo, Compass (Hokuto), GAGAN, and Quasi-Zenith Satellite automatically in addition to GPS. The satellites used in this embodiment are GPS and GLONASS. 36 is GNSS receiving means, and 37 is output.

Satellite 3a is a satellite chosen by boundary line 4 in two or more satellites 3 for positioning, and satellite 3b is a satellite newly chosen by boundary line 5 in two or more satellite 3. Boundary line 4 and boundary line 5 illustrate for convenience the elevation mask which is a parameter set up by GPS receiver 2.

By providing the threshold of an elevation angle, this elevation mask is a parameter set up in order not to receive the signal from the satellite of a low elevation angle where a multi-path error is large, and is suitably set up according to the environment where GPS receiver 2 was placed.

There are "roof", "urban canyon", etc. as environment where a GPS receiver is placed. And parameters, such as an elevation mask and a signal strength mask (C/N0 mask) (it mentions later in the Embodiment 2), have suitable setting experientially known for such every environment. For example, in the case of the "roof", setting of an elevation mask is 10 to 15 degrees, and, in the case of a "urban canyon", the setting is 20 degrees.

Next, a working and operation of this invention are explained with reference to FIGS. 1-2. First, when environment of GPS receiver 2 is made into the urban canyon, the initial value of the various parameters of GPS receiver 2 is set up by the initialization means 30 of GPS receiver 2. In the various parameters of GPS receiver 2, other different thresholds from an initial value, i.e., the 1st mask threshold, are set up by the 1st mask threshold setting section 31 of GPS receiver 2 about the threshold of an elevation mask.

In this embodiment 1, two thresholds of other different thresholds from an initial value and this initial value are set up about the threshold of an elevation mask. In these two thresholds, the threshold with a high elevation angle was set up as an initial value, and the threshold with a low elevation angle is set up as 1st mask threshold. On the contrary, the low threshold of a low elevation angle may be set up as an initial value, and the high threshold of a high elevation angle may be set up as 1st mask threshold.

In this embodiment 1, the initial value of the elevation mask, i.e., the high threshold of an elevation mask, was set as "30 degrees", and the 1st mask threshold, i.e., the low threshold of an elevation mask, is set as "20 degrees." The threshold of a Ratio test is set as "3."

Thus, after setting of the various parameters of GPS receiver 2 is completed, GPS receiver 2 receives the signal (observational data) from satellite 3 like the usual RTK positioning (step 11). Subsequently, only the signal from satellite 3a of a high elevation angle chosen by boundary line 4 is chosen from this received observational data (Step 12).

Based on the signal from selected satellite 3a, 1st RTK positioning calculation is performed by the RTK positioning calculation means 32 of GPS receiver 2 (step 13).

Next, the 1st quality check is performed by the quality checking means 33 of GPS receiver 2 about the positioning solution calculated by the 1st RTK positioning calculation (step 14). This quality check is performed by the Ratio test.

The Ratio test is a check using the residual ratio of the solution. When the solution of this Ratio test is more than the threshold specified by a user, this positioning solution is made into an FIX solution, i.e., a high precision positioning solution, and when the solution of this Ratio test is under the threshold specified by a user, this positioning solution is made into a FLOAT solution, i.e., a low precision positioning solution. In the Embodiment 1, the threshold of the solution of a Ratio test is set as "3" as mentioned above. The numerical value of this "3" is a numerical value experientially used as a threshold of a Ratio test in the field of RTK positioning.

In the 1st quality check, when the solution of a Ratio test is three or more, this positioning solution is made into a high precision positioning solution (step 15), and a user's high precision position is obtained by this high precision positioning solution.

On the other hand, in the 1st quality check, when the solution of a Ratio test is less than three, this 1st positioning solution is a low precision positioning solution.
Therefore, the threshold of the elevation mask is changed into other different thresholds from an initial value, i.e., the 1st mask threshold, by the mask threshold change means 34 of GPS receiver 2 (step 16).

Since the threshold of the elevation mask is changed into the 1st mask threshold from the initial value, in addition to satellite chosen by the initial value of the elevation mask, i.e., the satellite 3a chosen by boundary line 4, satellite chosen by the 1st mask threshold of the elevation mask, i.e., a satellite 3b is newly chosen by boundary line 5.

Based on the signal from selected satellite 3a and newly chosen satellite 3b, 2nd RTK positioning calculation is performed in the RTK positioning calculation means 32 of GPS receiver 2 (step 17).

The 2nd quality check is performed by the quality checking means 33 of GPS receiver 2 about the 2nd positioning solution recalculated by this 2nd RTK positioning calculation (step 18). In this 2nd quality check, since the recalculated 2nd positioning solution is also a low precision positioning solution (step 19) when the solution of a Ratio test is less than three, finally a user is obtained only a low precision positioning solution.

On the other hand, in the 2nd quality check, when the solution of a Ratio test is three or more, the recalculated positioning solution is made into a high precision positioning solution (step 15), and a user's high precision position is obtained by this high precision positioning solution.

When a threshold is fixation like conventional technology, a positioning solution turns into a low precision positioning solution, but the positioning solution can obtain a high precision positioning solution by recalculating by changing a threshold appropriately. Therefore, the capacity factor of a high precision positioning solution can be raised only by performing the check of RTK positioning calculation and a Ratio test 2 times respectively as mentioned above.

As shown in Table 1 and FIG. 4, the inventor experimented in the capacity factor in the urban canyon using the selection method and its selection device of the satellite by this invention. Table 1 and FIG. 4 show the result at the time of performing the fixed point observation of an entire day on condition of (a)-(c) in the known datum point of the urban canyon. (a) The result of having performed RTK positioning using the selection method and its selection device of the satellite by this invention, (b) The result of having performed RTK positioning by the conventional compound RTK positioning using a GPS Satellite and a GLONASS satellite, (c) The result of having performed RTK positioning by the conventional RTK-GPS positioning only using a GPS Satellite.

Table 1 shows the capacity factor of the FIX solution calculated from the time when the high precision positioning solution, i.e., an FIX solution, was obtained, and the time when this FIX solution was obtained about a total of observed time 86400 seconds (entire day).

TABLE 1

|  | (a) the present invention | (b) GPS + GLONASS | (c) GPS |
|---|---|---|---|
| time to obtained a fixed solution (sec) | 34560 | 29520 | 7920 |
| total observation time (entire day) (sec) |  | 86400 |  |
| availability of fixed solution (hours) | 9.6 | 8.2 | 2.2 |

FIG. 4 shows the result of the RTK positioning in the time zone (26000 seconds-31000 seconds) when the effect by the selection method of the satellite by this invention appears notably to the conventional method. In FIG. 4, a horizontal axis is time (second), the black dot in a figure shows the positioning result of a high precision positioning solution, i.e., an FIX solution, and the vertical axis shows the positioning error of the direction of east and west of this FIX solution. In FIG. 4, home position 0 of a vertical axis is a true value without a positioning error.

As shown in Table 1, in the selection method and its selection device (a) of the satellite by this invention, the total time (capacity factor) which can use a high precision position at an entire day improved till 9.6 hours (40%). When the capacity factor by the value (9.6 hours) of this capacity factor and the method of conventional technology is compared. The capacity factor increased 1.4 hours in the result (8.2 hours) depended on (b), and increased to 4 or more times in the result (2.2 hours) depended on (c).

If (b) of conventional technology and (c) of conventional technology are compared with the selection method and its selection device (a) of the satellite by this invention as shown in FIG. 4, the positioning point which shows the black dot in a figure, i.e., the positioning result of an FIX solution, will increase. Therefore, it is clear also from the result shown in FIG. 4 by performing RTK positioning using the selection method and its selection device (a) of the satellite by this invention that a capacity factor increases.

The check of positioning calculation and a Ratio test requires time in general GPS positioning. However, it is enough to obtain a high precision positioning solution, if the selection method and its device of the satellite by this invention is used and the check of positioning calculation and a Ratio test will be performed a maximum of 2 times respectively. Therefore, the selection method and its selection device of the satellite by this invention is suitable for use of the real time in RTK positioning.

Embodiment 2

Figure 3:
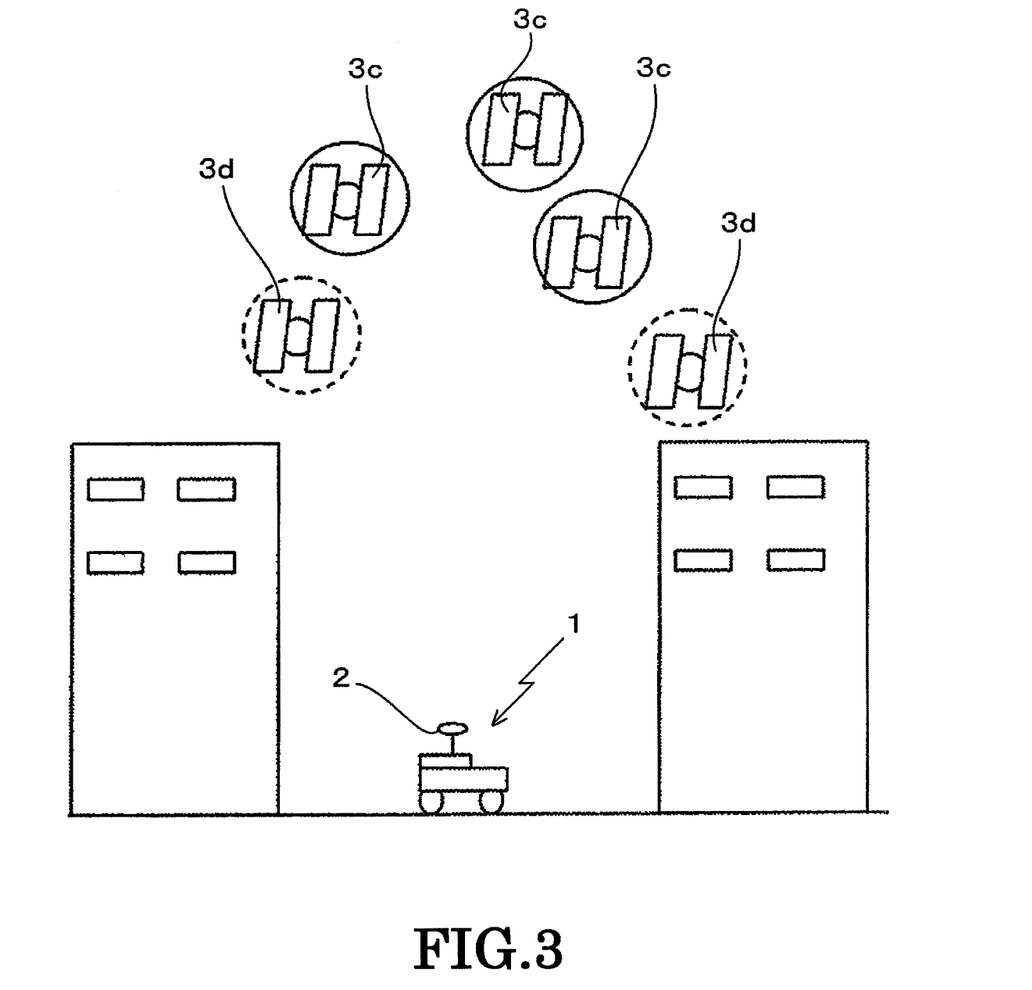
FIG. 3 shows the 2nd embodiment of this invention, in the selection method and its selection device of the satellite by this invention, it is a mimetic diagram for explaining the principle when changing the threshold of a signal strength mask.

The 2nd embodiment of this invention is explained in detail based on FIGS. 2-3.

FIG. 2 shows the embodiment of this invention, and is a flow chart for explaining the selection method and its selection device of the satellite by this invention. FIG. 3 is a mimetic diagram for the 2nd embodiment of this invention being shown and explaining the principle which makes the threshold of a signal strength mask variable with the selection method and its selection device of the satellite by this invention.

Although the 1st embodiment is an embodiment which made the threshold of the elevation mask variable, the 2nd embodiment is an embodiment which made the threshold of the signal strength mask variable. About the same portion as the 1st embodiment, the explanation is omitted using the same name and the same number.

In FIG. 3, satellite 3c is a satellite chosen from two or more satellites 3 by the initial value of the threshold of a signal strength mask. And satellite 3d is a satellite newly chosen from two or more satellites 3 by other thresholds from which the initial value of the threshold of said signal strength mask differs.

This signal strength mask is a parameter set up in order not to receive the signal from the satellite where the multipath error is large and signal strength is low, and is suitably set up according to the environment where GPS receiver 2 was placed.

Next, working and operation are explained based on FIG. 2-FIG. 3. First, when environment of GPS receiver 2 is made into the urban canyon, the initial value of the various parameters of GPS receiver 2 is set up by the initialization means 30 of GPS receiver 2. In the parameter of GPS receiver 2, the threshold of a signal strength mask sets up other different thresholds from an initial value, i.e., the 1st mask threshold, by the 1st mask threshold setting means 31 of GPS receiver 2.

In this embodiment 2, the threshold of a signal strength mask is set as two thresholds of other different thresholds from an initial value and this initial value. In these two thresholds, the threshold with high signal strength was set up as an initial value, and the threshold with low signal strength is set up as 1st mask threshold. On the contrary, it is good that a threshold with low signal strength may be set up as an initial value, and a threshold with high signal strength may be set up as 1st mask threshold.

In this embodiment 2, the initial value of the signal strength mask, i.e., the high threshold of a signal strength mask, was set as "30 dB-Hz", and the 1st mask threshold, i.e., the low threshold of a signal strength mask, is set as "10 dB-Hz." The threshold of a Ratio test is set as "3" like Embodiment 1.

After establishment of the various parameters of GPS receiver 2 is completed, GPS receiver 2 receives the signal (observational data) from satellite 3 like the usual RTK positioning (step 11). Subsequently, only the signal from satellite 3c where the signal strength chosen by the initial value of the signal strength mask set up first is high is chosen from this received observational data (step 12).

Based on the signal from selected satellite 3c, 1st RTK positioning calculation, i.e., the 1st RTK positioning calculation, is performed in the RTK positioning calculation means of GPS receiver 2 (step 13).

Next, the 1st quality check is performed by the quality checking means 33 of GPS receiver 2 about the 1st positioning solution calculated by the 1st RTK positioning calculation (step 14). This quality check is performed by the Ratio test.

In the 1st quality check, when the solution of a Ratio test is three or more, this positioning solution is made into a high precision positioning solution (step 15), and a user's high precision position is obtained by this high precision positioning solution.

On the other hand, in the 1st quality check, when the solution of a Ratio test is less than three, this 1st positioning solution is a low precision positioning solution. Then, the threshold of a signal strength mask is changed into other thresholds which are different from this initial value from an initial value, i.e., the 1st mask threshold, by the mask threshold change means 34 of GPS receiver 2 (step 16).

In addition to satellite 3c chosen by the initial value of the signal strength mask, by changing into the 1st mask threshold from the initial value of a signal strength mask, satellite 3d newly chosen by the 1st mask threshold of a signal strength mask are chosen further. Based on the signal from selected satellite 3c and newly chosen satellite 3d, the 2nd RTK positioning calculation is performed in the RTK positioning calculation means 32 of GPS receiver 2 (step 17).

The 2nd quality check is performed by the quality checking means 33 of GPS receiver 2 about the 2nd positioning solution recalculated by this 2nd RTK positioning calculation (step 18). Also in this 2nd quality check, when the solution of a Ratio test is less than three, the recalculated positioning solution is also a low precision positioning solution (step 19). Therefore, finally a user is obtained only a low precision positioning solution.

On the other hand, in the 2nd quality check, when the solution of a Ratio test is three or more, the recalculated positioning solution is made into a high precision positioning solution (step 15), and a user's high precision position is obtained by this high precision positioning solution.

INDUSTRIAL APPLICABILITY

In the selection method and its selection device of the satellite used for the RTK positioning calculation by this invention. This invention is applicable to control of a movable body in the field of UAV (Unmanned Aerial Vehicles) which needs automatic control with a highly precise movable body, or the field of ITS (Intelligent Transport Systems). This invention is applicable also to compound RTK positioning which is the global positioning system of the EU area, such as Galileo, Hokuto of China, and GAGAN of India.

In the movable body of the urban canyon, in order to raise the robustness of a communication network, the speed information in RTK positioning is used, but the capacity factor of a highly precise position can be raised by applying this invention to this.

The invention claimed is:

1. A selection method of satellites for RTK positioning calculation via an elevation angle mask, which chooses a satellite according to an elevation angle of the satellite, and/or a signal strength mask, which chooses a satellite with the signal strength of the satellite, the selection method comprising:

receiving a signal from each of the satellites with an electronic device;

initializing a mask threshold of said elevation angle mask and/or a mask threshold of said signal strength mask;

setting a mask threshold of either said elevation angle mask or said signal strength mask as a first mask threshold other than a mask threshold which carried out an initial setting;

performing a first RTK positioning calculation based on signals from four or more chosen satellites via said initialized mask threshold;

performing a first quality check about a positioning solution in the first RTK positioning calculation of a device position, wherein when a solution of a ratio test by the first quality check is more than a threshold of the ratio test set up by a user, a first positioning solution in said first RTK positioning calculation is a high precision positioning solution, and wherein when a solution of the ratio test by said first quality check is under the threshold of the ratio test, the mask threshold for either the elevation or the signal strength mask is changed to the first mask threshold;

performing a second RTK positioning calculation based on signals from four or more satellites newly chosen via said first mask threshold with the signals from the satellites chosen via said mask threshold which carried out initial setting; and performing a second quality check about a second positioning solution in the second RTK positioning calculation of the device position, wherein when a solution of the ratio test by the second quality check is more than the threshold of the ratio test, the second positioning solution in said second RTK positioning calculation is taken as a high precision positioning solution, when the decision result by said second quality check is less than the threshold of a ratio test, the positioning solution in said second RTK positioning calculation is made into a low accuracy positioning solution, and each of said positioning calculations and said quality checks is ended after performing the calculation and check no more than two times.

2. The method according to claim 1, wherein a signal of an available satellite signal enables selection of a signal from GLONASS automatically with a GPS signal.

3. In the selection method of satellites for RTK positioning calculation according to claim 1, wherein a signal of one of a Galileo, Compass (Hokuto), GAGAN, and Quasi-Zenith Satellite is automatically selected with a GPS signal.

* * * * *